United States Patent [19]

Nanba et al.

[11] E Re. 28,942

[45] Reissued Aug. 24, 1976

[54] EXPOSURE TIME CONTROL DEVICE FOR A THROUGH THE LENS TYPE SINGLE REFLEX CAMERA

[75] Inventors: Yasuhiro Nanba, Toyokawa; Masayoshi Sahara, Sakai; Kintaro Yada, Ikeda all of Japan

[73] Assignee: Minolta Camera Kabushiki Kaisha, Osaka, Japan

[22] Filed: Sept. 4, 1975

[21] Appl. No.: 610,421

Related U.S. Patent Documents

Reissue of:

[64] Patent No.: 3,756,130
Issued: Sept. 4, 1973
Appl. No.: 132,104
Filed: Apr. 7, 1971

[30] Foreign Application Priority Data

Apr. 7, 1970 Japan ..... 45-29019
Apr. 7, 1970 Japan ..... 45-29020

[52] U.S. Cl. ..... 354/24; 354/31; 354/51

[51] Int. Cl.[2] ..... G03B 7/08

[58] Field of Search ..... 354/24, 50, 51, 31

[56] References Cited

UNITED STATES PATENTS

| | | | |
|---|---|---|---|
| 3,324,779 | 6/1967 | Nobusawa et al. | 354/51 |
| 3,490,835 | 1/1970 | Nemeth et al. | 354/50 |
| 3,641,890 | 2/1972 | Ono | 354/24 |
| 3,670,637 | 6/1972 | Mori et al. | 354/24 |
| 3,731,603 | 5/1973 | Ono et al. | 354/24 |
| 3,752,045 | 8/1973 | Ono et al. | 354/24 |

FOREIGN PATENTS OR APPLICATIONS

| | | | |
|---|---|---|---|
| 18,672 | 8/1969 | Japan | 95/10 |

*Primary Examiner*—Russell E. Adams, Jr.
*Attorney, Agent, or Firm*—Watson, Cole, Grindle & Watson

[57] ABSTRACT

First and second output voltages are generated respectively in accordance with the logarithm of the intensity of light and as a function of a manually set exposure condition. A control signal to initiate shutter closing is generated when a signal which changes in proportion to the logarithm of an elapsed time period initiated by shutter release operation plus the second output voltage is substantially equal to the first output voltage. The control device includes a circuit for comparing the voltages. The device may be modified to generate a third output voltage which changes in response to the change of the signal and then comparing the first output voltage with the second plus the third output voltage.

10 Claims, 10 Drawing Figures

INVENTOR.
Yasuhiro Nanba
BY Masayoshi Sakaue
Kintaro Yada
Watson, Cole, Grindle & Watson INVENTOR.
Yasukio Maeda
BY Masayoshi Sakara
Kintaro Yada
Watson, Cole, Grindle & Watson INVENTOR
Yasuhiro Nanba
BY Masayoshi Sakata
Kintaro Yada
Watson, Cole, Grindle & Watson INVENTOR.
Yasuhiro Nanba
BY Masayoshi Sakura
Kintaro Yada
Watson, Cole, Grindle & Watson INVENTOR.
Yasuhiro Namba
BY Masayoshi Sahara
Kintaro Yada
Watson, Cole, Grindle & Watson

EXPOSURE TIME CONTROL DEVICE FOR A THROUGH THE LENS TYPE SINGLE REFLEX CAMERA

Matter enclosed in heavy brackets [ ] appears in the original patent but forms no part of this reissue specification; matter printed in italics indicates the additions made by reissue.

BACKGROUND OF THE INVENTION

The present invention relates to an exposure time control device [ in ] *for* a "through the lens" type single reflex camera. In a single reflex camera it is impossible to [ do photometry while in ] *take a photometric measurement during an* exposure, so that the photometric value prior to exposure is [ memorized ] *stored* by a [ memory condenser ] *capacitor* so as to control the exposure [ through said memory ] *by the stored* voltage. However, in order to [ memorize ] *store* a wide range of [ the ] object brightness [ in the memory condenser ] a means has been adopted for giving a logarithmic compression to the illuminance on the light receiving surface of a photoconductive element and [ memorizing the ] *storing* a voltage [ given said ] *representing that* logarithmic compression in the [ memory condenser ] *storage capacitor.*

And, up to the present time, when the exposure is controlled [ through said memory voltage ] the [ memory ] *stored* voltage [ given said logarithmic compression ] is given [ the ] *an* inverse-logarithmic conversion by a [ logarithm elongation ] *conversion* element and the exposure control circuit is operated by the output thereof.

However, in the case [ of that ] *where* the inverse-logarithmic conversion is [ given by the logarithm elongation element ] *provided* the voltage variation quantity given the logarithmic compression [ for giving ] *representing* 1 EV of variation *relative* to the exposure value [ through the output elongated ] is restricted by the characteristic of [ said logarithm elongation ] *the conversion* element [ , and as the result ] . *Thus*, the voltage variation [ quantity ] per 1 EV [ in progress ] of the logarithmic compression is very small, therefore, errors are [ easy to intervene ] *generated*, resulting in [ dropping remarkably ] *a degradation of* the precision in [ progress of the logarithm elongation ] *the conversion process.*

OBJECTS OF THE INVENTION

One object of the present invention is to provide an *improved* exposure time control device in a "through the lens" type single reflex camera, which [ is removed from ] *overcomes* the prior drawbacks mentioned above and controls the exposure time without [ giving ] *the necessity of* the inverse-logarithmic conversion. [ to the memory voltage given the logarithmic compression ] .

Another object of the present invention is to provide an exposure time control device in a "through the lens" type single reflex camera, which is able to set up optionally the voltage variation quantity per 1 EV in the logarithmic compression process.

[ FEATURES OF THE INVENTION: ] *SUMMARY OF THE INVENTION*

[ Further another object ] *One feature* of the present invention is to provide an exposure time control device in a "through the lens" type single reflex camera, which is so formed that the [ memory ] *stored* voltage [ given said logarithmic compression ] is compared with the output voltage of the reference time integrating circuit, which output voltage increases in proportion to the logarithmic value [ of the time ] from the exposure starting *time* by means of a comparison circuit, and when [ said ] both voltage coincide with each other the exposure is [ ended and controlled ] *terminated.*

Still [ further ] another [ object ] *feature* of the present invention is to provide an exposure time control device in a "through the lens" type single reflex camera, which is so formed that [ as a comparison circuit ] a differential amplifier circuit is [ put to use ] *used as a comparison circuit*, and [ to the emitter and collector circuits of a transistor having the memory ] *stored* voltage of the [ memory condenser ] *storage capacitor* as one input of [ said ] *the* differential amplifier circuit and the fixed base electric potential as the other input [ , condensers are respectively connected, and the ] . *The* charging voltage of the [ condenser ] *capacitor* in [ said ] *the* collector circuit is impressed *on the differential amplifier* and when both input voltages become equal the output of [ said ] *the* differential amplifier circuit operates the switching circuit for the exposure control circuit.

Still [ further ] another [ object ] *feature* of the present invention is to provide an exposure time control device in a "through the lens" type single reflex camera, which controls the exposure corresponding to photographic conditions by connecting a bias resistance for film sensitivity [ change ] and stop value changes to an input [ condenser impressed in said ] *capacitor of the* differential amplifier circuit.

Still [ further ] *yet* another [ object ] *feature* of the present invention is to provide an exposure time control device in a "through the lens" type single reflex camera, which compensates *for* the fluctuation of [ an ] electric power source voltage.

[ SUMMARY OF THE INVENTION: ]

In order to attain the above-mentioned objects *and features*, the *apparatus of the* present invention [ relates to an exposure time control device in a "through the lens" type single reflex camera, which ] is so constructed that there are provided a [ memory condenser ] *storage capacitor* for [ memorizing ] *storing* the output voltage of a photometric circuit for detecting the voltage proportional to the logarithmic value of the illuminance on the light receiving surface of a photoconductive element prior to exposure [ , and a ] . *A* reference time integrating circuit [ which ] *is included having an* output voltage *which* increases in proportion to the logarithmic value [ of the time ] from the exposure starting *time*, and to one [ side ] *input* of a comparison circuit the [ memory ] *stored* voltage [ of said memory condenser ] is [ input ] *connected* and to the other [ side ] *input* of [ said ] *the* [ comparative ] *comparison* circuit the output voltage of [ said ] *the* reference time integrating circuit is [ input, and said both ] *connected. Both* voltages are compared to each other by [ said ] *the* comparison circuit and when they coincide with each other the output of [ said ] *the* comparison circuit operates an exposure time control circuit [ ; wherein since ] . *Since* the comparison circuit compares the voltage proportional to the logarithmic value of the illuminance on the light receiving surface of the photoconductive element directly with the voltage proportional to the logarithmic value of the exposure time the device has no need [ of ] *for* a means for converting the [ memory ] *stored* voltage of the [ memory condenser to ] *storage capacitor by* the inverse logarithm *technique*.

DESCRIPTION OF THE PREFERRED EMBODIMENT

Figure 1:
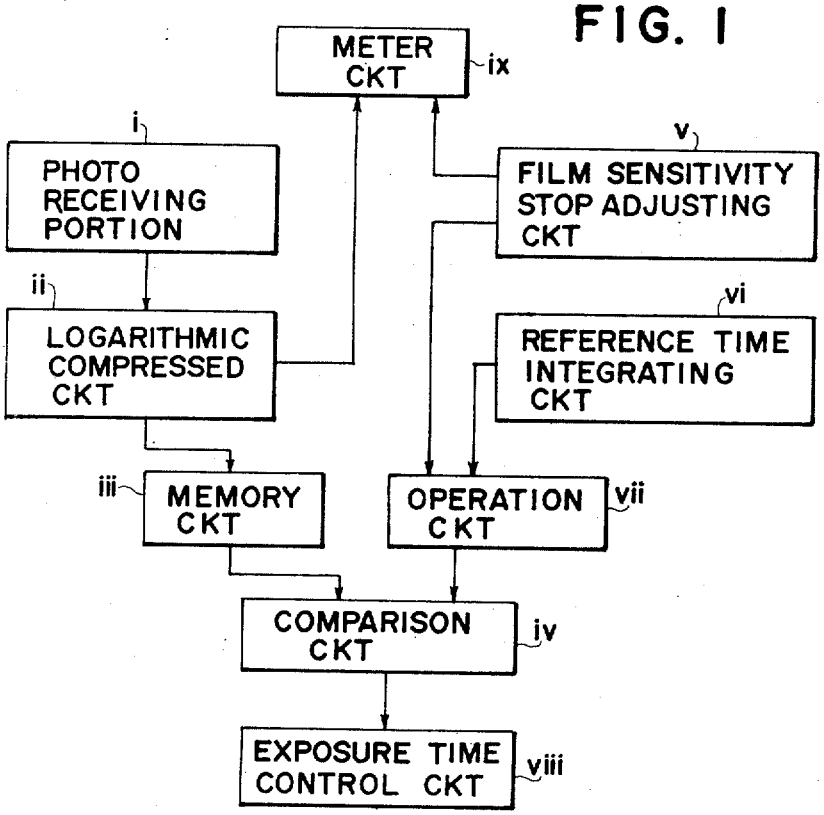
FIG. 1 is a block diagram of the circuit showing the fundamental formation of the present invention.

FIG. 1 shows the principle of the present invention, wherein the information [ of ] *representing the* the brightness of an object coming into photoreceiving portion (i) is [ compressed by logarithmic ] *logarithmically* compressed *by* circuit (ii) and then comes into memory circuit (iii). Just prior to exposure, photoreceiving portion (i) is disconnected from memory circuit (iii) and the information [ of ] *representing the* brightness of the object just prior to photographing is [ memorized ] *stored* by memory circuit (iii) [ , however, it ] . *However, the logarithmically compressed value* is [ memorized by receiving the logarithmic compression ] *stored* so that it is possible to [ be memorized in good precision to ] *store* the object brightness covering a wide range [ coming up to scores of thousands times ] *of a few orders of magnitude* between the highest and the lowest *value with good precision*.

The information [ memorized ] *stored* by memory circuit (iii) [ comes into ] *is provided to* comparison circuit (*iv*).

The information in film sensitivity and stop adjusting circuit (v) comes into operation circuit (vii) together with the information in reference time integrating circuit (vi) which output is in proportion to the logarithmic value [ of ] *from* the time [ from ] *of* the *start of* exposure [ starting, to be operated therein, and the ]. *The* information in operation circuit (vii) [ comes into ] *is also provided to* comparison circuit [ vi ] (*iv*) to be compared with the information in the memory circuit (iii), and when the information [ in ] *from* operation circuit (vii) becomes equal to the information [ in ] *from* memory circuit (iii) [ the ] *a* relay [ for ] *in* exposure time control circuit (viii) is reversed and the exposure time is controlled.

The information of the object brightness in logarithmic compressed circuit (ii) and the information in film sensitivity and stop adjusting circuit (v) [ come ] *are* also [ into ] *provided to* meter circuit (ix) to indicate the shutter speed.

Figure 2:
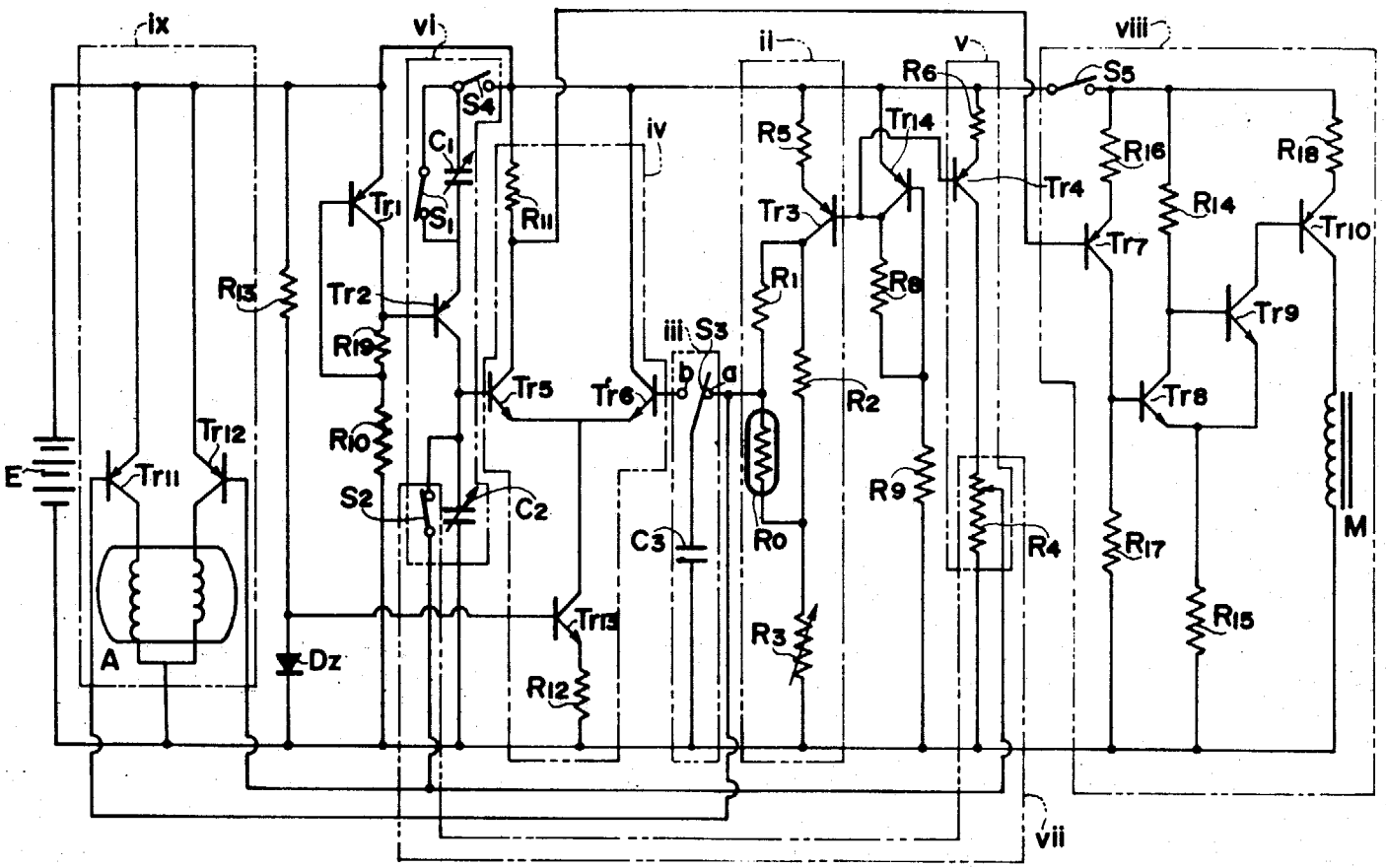
FIG. 2 is the exposure time control circuit diagram in the exposure time control device in a "through the lens" type single reflex camera in accordance with the present invention.

FIG. 2 shows the exposure time control circuit of an embodiment in accordance with the present invention.

Figure 5:
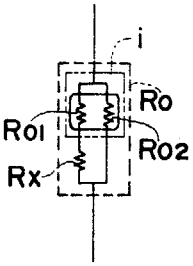
FIG. 5 is a circuit diagram of the composite photoconductive element showing an example of the light receiving element in the present invention.

Photoconductive element $R_0$ is composed of, as shown in FIG. 5, two photoconductive elements $R_{01}$, $R_{02}$ [ composed of ] *having* a composite photoconductive element and constituting photoreceiving portion (i) and [ disposed ] *connected* in parallel with each other, and fixed resistance $R_x$ connected in series to photoconductive element $R_{01}$. The [ connection point ] *junction* between [ said ] composite photoconductive element $R_0$ and fixed resistance $R_1$ [ connected in series thereto ] is connected to contact [ a for ] *a of* change over switch $S_3$ in memory circuit (iii) [ , and said resistance connection bodies ] . *Resistances* $R_0$, $R_1$ are connected to the collector circuit of transistor $Tr_3$ together with resistance $R_2$ in parallel therewith and variable resistance $R_3$ in series thereto [ , and the ] . *The* emitter of [ said ] transistor $Tr_3$ is connected to the positive side of electric power source E through resistance $R_5$ to constitute logarithmic compressed circuit (*ii*).

Transistor $Tr_4$ [ having ] *has* the same base [ electric ] potential [ as that of said ] *and identical characteristics as that of* transistor $Tr_3$ [ is a transistor of the identical characteristic ] and the same electric current runs through them [ , and by variable ] . *Variable* resistance $R_4$ connected to the collector of [ said ] transistor $Tr_4$ *also forms part of* adjusting circuit (v) for changing the film sensitivity and stop value. [ is constituted ] .

[ To ] *Capacitors $C_1$, $C_2$ are respectively connected to* the emitter and the collector of transistor $Tr_2$ [ having the ] *which has a* fixed base [ electric ] potential by connecting its base to the collector of first step compensation transistor $Tr_1$ which connects resistance $R_{19}$ between the base and the collector and resistance $R_{10}$ to the base as a bias resistance [ , condensers $C_1$, $C_2$ are respectively connected, and between said condenser ] . *Between capacitor* $C_1$ and the positive side of electric power source E there is provided trigger switch $S_4$ which is ordinarily opened and *then* closed simultaneously with starting of the shutter opening operation [ ; and in ] . *In* parallel with both [ said condensers ] *capacitors* $C_1$, $C_2$ discharge switches $S_1$, $S_2$ are respectively provided; and the charging voltage of [ condenser ] *capacitor* $C_2$ in reference time integrating circuit (vi) *is* connected to operation circuit (vii), composed of variable resistance $R_4$, [ connected in series to said ] *through* discharge switch $S_2$ and [ disposed in said film sensitivity and stop adjusting circuit (v) ] is input into the base of transistor $Tr_5$ in the differential amplifier circuit as the first input [, and contact b for ]. *Contact b of* change over switch $S_3$ in [ said ] memory circuit (iii) is connected to the base of transistor $Tr_6$ [ as ] *to provide* the second input, and the emitters of both transistors $Tr_5$, $Tr_6$ are connected to the collector of transistor $Tr_{13}$ [, and to the emitter of said transistor $Tr_{13}$ resistance ] . *Resistance* $R_{12}$ is connected *to the emitter of transistor* $Tr_{13}$, and the base of [ said ] transistor $T_{13}$ is connected to the [ connection point ] *junction* between resistance $R_{13}$ and diode $D_2$ to compensate [ the ] *for changes in* temperature [, and to the collector of said transistor $Tr_5$ resistance] . *Resistance* $R_{11}$ is [ inserted ] *connected to the collector of transistor* $Tr_5$, and thus comparison circuit (iv) is formed.

[As for ] *With respect to* exposure time control circuit (viii), main switch $S_5$ of electromagnetic coil M is [ provided ] *connected* to electric power source E and a Schmitt circuit composed of $Tr_7$, $Tr_8$, $Tr_9$, and $Tr_{10}$ is formed [, and to the base of transistor $Tr_7$ on the input side thereof the ] . *The* collector of transistor $Tr_5$ in [ said ] comparison circuit (iv) is connected [ and to the collector of Transistor $Tr_{10}$ on the output side thereof said electromagnetic ] *to the base of transistor* $Tr_7$. *Electromagnetic* coil M is connected *to the collector of transistor* $Tr_{10}$, and the moment main switch $S_5$ is closed transistors $Tr_9$, $Tr_{10}$ are [ electrified ] *made conductive* and electromagnetic coil M is excited [, and the ] . *The* moment transistor $Tr_5$ in the differential amplifier circuit is reversed transistors $Tr_7$, $Tr_8$ are [ electrified ] *made conductive* and transistors $Tr_9$, $Tr_{10}$ are cut off and the excitation of electromagnetic coil M is stopped and accordingly *the* closing operation of the shutter is started.

Meter circuit (ix) is provided with two amplifier transistors $Tr_{11}$, $Tr_{12}$ to [ give the logarithmic elongation by ] *logarithmically elongate* the electric current [ to the electric potential ] at contact [ a for said ] *a of* change over switch $S_3$ and the bias voltage of condenser $C_2$ in reference time integrating circuit (vi) [, and ] . *Meter circuit (ix) is* composed of double coil ammeter A [ which ] *the* coils *of which* are wound [ to the opposite direction ] *oppositely* so as to indicate the difference between the electric potential at contact a and the bias voltage of condenser $C_2$, namely, the shutter speed.

Figure 3:
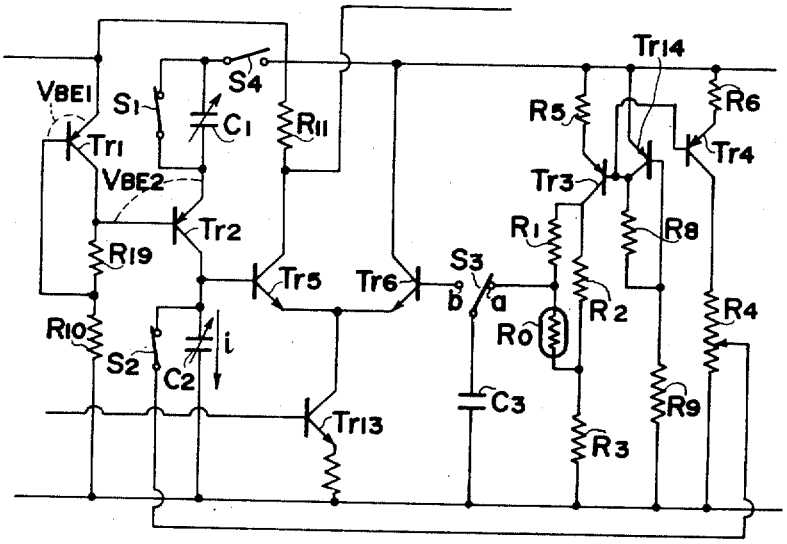
FIG. 3 is an enlarged circuit diagram of the essential portion of [ said ] *the* circuit *of FIG. 2*.

FIG. 3 [ is a partial view ] *shows part* of FIG. [1 ] *2* and [ shows ] the essential portion *thereof* according to the present invention. At the first stage of the shutter release, switches $S_1$, $S_2$ are [ cut off ] *closed* and when trigger switch $S_4$ is [ electrified ] *closed* simultaneously with starting of the shutter opening operation the charging [ to condensers ] *of capacitors* $C_1$, $C_2$ is started.

[Now, let us think over ] *The following describes* how *the* charging voltages $V_1$, $V_2$ of [ condensers ] *capacitors* $C_1$, $C_2$ change [ in the lapse of ] *with* time from the time when trigger switch $S_4$ is [ electrified ] *closed*, that is, the shutter starts to open. [ Provided ] *Assuming* the voltage between the base and the emitter of transistors $Tr_1$ is $V_{BE1}$, [ this turns to the base electric potential of transistor $Tr_2$,] and the resistance value of resistance $R_{19}$ is for compensating the voltage and *is* so small as *to be* negligible, so that provided the charging voltage of [ condenser ] *capacitor* $C_1$ is $V_1$, voltage $V_{BE2}$ between the base and the emitter of transistor $Tr_2$ is as follows:

$$[V_{BE2}]\ V_{BE1} = [V_{BE1}]\ V_{BE2} + V_1 \qquad (1)$$

and collector current i of transistor $Tr_2$ is as follows:

$$[V_{BE2}]\ V_{BE1} = V_0 \log i + V_1$$

wherein $V_0$ [, $V_1$ are respectively ] *is* a [ proportion ] constant of transistor $Tr_2$.

And, provided the capacity of [ condenser ] *capacitor* $C_1$ is $C_1$, charging voltage $V_1$ is as follows:

$$V_1 = \frac{1}{C_1}\int_0^t i\,dt$$

Therefore, from formula (1) the following formula is obtained:

$$[V_{BE2}]\ V_{BE1} = V_0 \log i + V_1 + \frac{1}{C_1}\int_0^t i\,dt \qquad (2)$$

In order to [ look for ] *obtain* the relation between i and t, upon differentiating [ said ] formula (2) with *respect to* t *as* $V_{BE1}$ *is constant with t*, $$0 = V_0 \frac{1}{i}\frac{di}{dt} + \frac{1}{C_1}\int - \frac{1}{C_1 V_0}dt = \int \frac{1}{i^2}di - \frac{1}{C_1 V_0}$$
$$= -\frac{1}{i} + K \qquad (3)$$

Provided that the characteristics of transistors $Tr_1$, $Tr_2$ are identical and the current running through $Tr_1$ is $I_0$, the collector current of transistor $Tr_2$ at the moment trigger switch $S_4$ is [ electrified ] *closed* (namely, t=0) [ turns ] *is* also [ to ] $I_0$, so that K of [ said ] formula (3) is as follows:

$$K = \frac{1}{I_0}$$

Therefore, from formula (3)

$$\frac{t}{C_1 V_0} = \frac{1}{i} - \frac{1}{I_0}$$

$$i = \frac{1}{\left(\frac{t}{C_1 V_0} + \frac{1}{I_0}\right)} \qquad (4)$$

$$C_1 V_1 = \int_0^t i\,dt = \int_0^t \frac{dt}{\left(\frac{t}{C_1 V_0} + \frac{1}{I_0}\right)}$$
$$= \left[C_1 V_0 \log\left(\frac{t}{C_1 V_0} + \frac{1}{I_0}\right)\right]_0^t$$
$$= C_1 V_0 \left\{\log\left(\frac{t}{C_1 V_0} + \frac{1}{I_0}\right) - \log\frac{1}{I_0}\right\}$$
$$= C_1 V_0 \log\left(\frac{I_0 t}{C_1 V_0} + 1\right)$$

Therefore, $$C_1 V_1 = C_2 V_2 = C_1 V_0 \log\left(\frac{I_0 t}{C_1 V_0} + 1\right)$$

-continued $$V_1 = V_o \log\left(\frac{I_o t}{C_1 V_o} + 1\right) \quad (5)$$

$$V_2 = \frac{C_1 V_o}{C_2} \log\left(\frac{I_o t}{C_1 V_o} + 1\right) \quad (6)$$

As shown in formula (6) the increase of charging voltage $V_2$ of the first input [ condenser ] *capacitor* $C_2$ is the differential amplifier circuit is in proportion to the logarithmic value of the time from the time when trigger switch $S_4$ is [ electrified ] *closed*.

Figure 4:
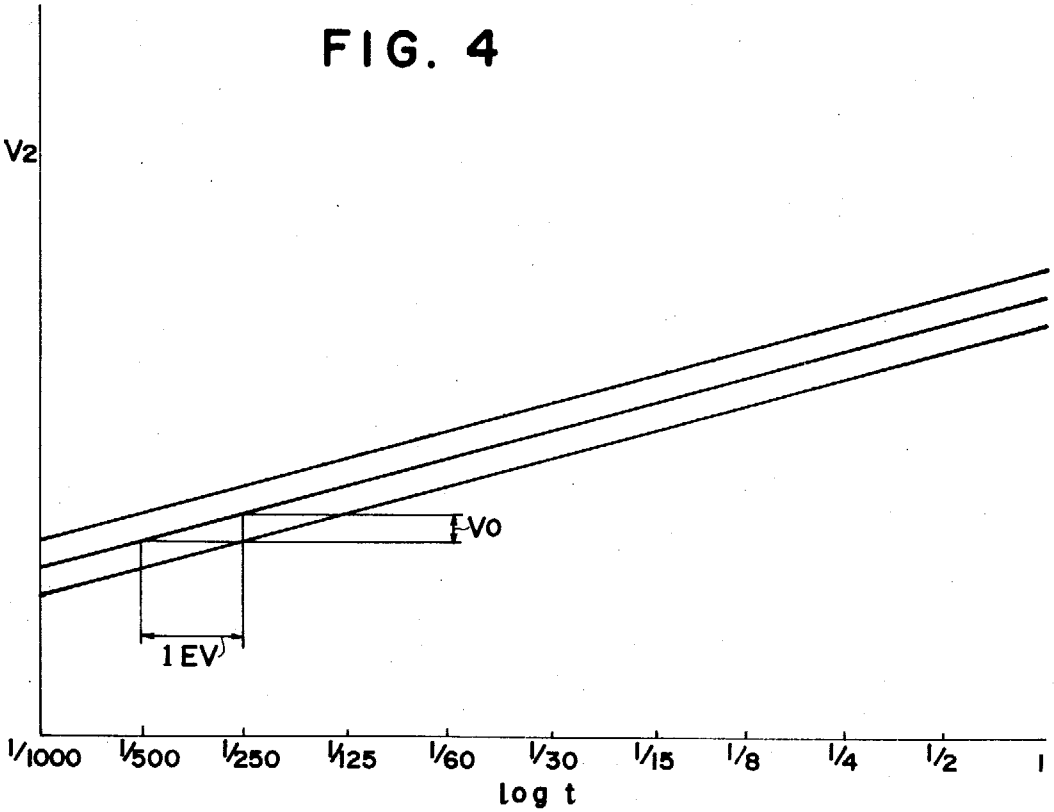
FIG. 4 is a diagram showing the relation between the logarithmic value of the time and the charging voltage after the fixed base voltage constituting the reference time integrating circuit [ in accordance with the present invention ] is impressed and the trigger switch for the condenser inserted in the collector circuit of the transistor is closed.

In FIG. 4 the relation between charging voltage $V_2$ of [ said condenser ] *capacitor* $C_2$ and the time from the *instant* [time] when trigger switch $S_4$ is [electrified ] *closed* is shown.

Upon changing the [ setting ] film sensitivity *setting* and stop value the resistance [ value ] of variable resistance $R_4$ undergoes a change and the bias voltage at [ the first stage of condenser ] *capacitor* $C_2$ is changed, so that as shown in FIG. 4 the time characteristic of charging voltage $V_2$ is moved [ in ] parallel by changing the film sensitivity and stop value.

[ By the way ] *Also*, by changing the capacity ratio of [ condensers ] *capacitors* $C_1$, $C_2$ it is possible to obtain any charging characteristic of [ condenser ] *capacitor* $C_2$.

Figure 6:
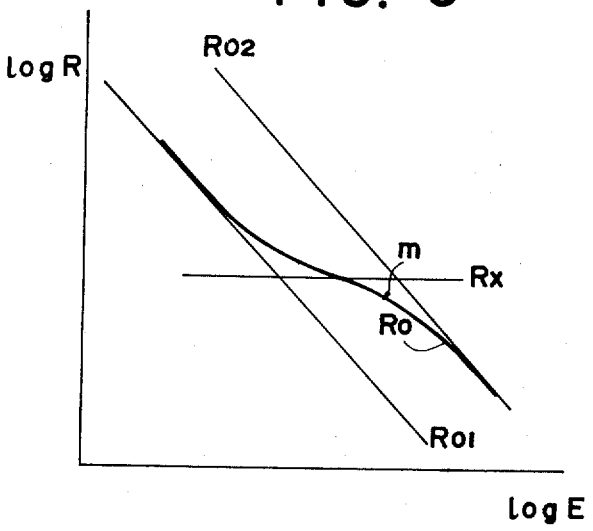
FIG. 6 is a diagram showing the relation between the illuminances on the light receiving portion of [ said ] *the* composite photoconductive element and on the light receiving face of the fixed resistance, and the respective [ resistance value ] *resistances thereof*.

Photoconductive element $R_0$ is a composite photoconductive element and formed as shown in FIG. 5, and photoconductive elements $R_{01}$, $R_{02}$ which are the [ formation ] elements of [ said ] photoconductive element $R_0$ have the characteristic as shown in FIG. 6 relative to the logarithmic value of the illuminance on the light receiving surface, and fixed resistance $R_x$ also has the value as shown in FIG. 6 [ , therefore ] . *Therefore*, composite photoconductive element $R_0$ has the characteristic as shown by the thick line in FIG. 6 relative to the logarithmic value of the illuminance on the light receiving surface.

Figure 8:
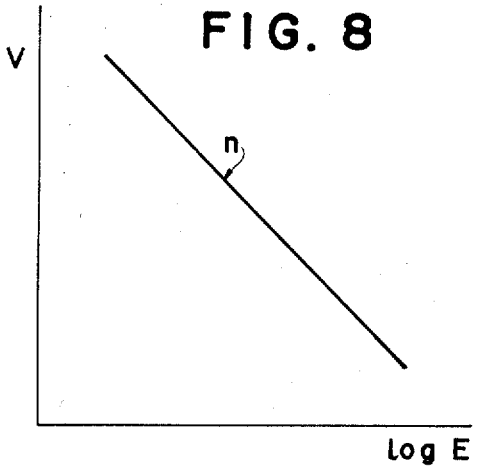
FIG. 8 is a diagram showing the relation between the electric potential at the connection point in the circuit shown in FIG. 7 and the light receiving illuminance.
Figure 7:
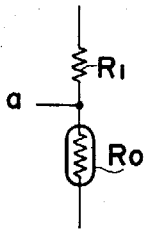
FIG. 7 is a partial view of the photometric circuit in which the composite photoconductive element shown in FIG. 5 is connected in series to the fixed resistance.

FIG. 7 shows the circuit in the case [ of that ] *where* composite photoconductive element $R_0$ having [ the illuminance on the light receiving surface — ] the resistance characteristic shown in FIG. 6 is connected in series to fixed resistance $R_1$ [ , and ] . FIG. 8 shows the relation between the electric potential (volt) thereof and the illuminance on the light receiving surface [ , and the ] . *The* electric potential at contact a is [ given the logarithmic compression to the illuminance on the light receiving surface ] *logarithmically compressed* and undergoes a change by $V_0$ relative to the variation of [ one grade ] *1 EV* of the illuminance on the light receiving surface [ (1 EV) ] .

In the case of the present invention, therefore, by changing the circuit constant of the reference time integrating circuit (for example, the capacity ratio of [ condensers ] *capacitors* $C_1$, $C_2$, the base voltage of transistor $Tr_2$) the slope of the charging characteristic of [ condenser ] *capacitor* $C_2$ shown in FIG. 4 is optionally changed and the variation quantity per 1 EV in the logarithmic compression [ progress ] shown in FIG. 6 can be made [ to the highest precision value ] *precise* in accordance with the power voltage used and the photometric range.

[ In the case of giving the logarithmic elongation by means of a well known logarithmic elongation element, however, the variation quantity in the logarithmic compression progress for changing 1 EV by the output in the elongation progress is restricted by the characteristic of the logarithmic elongation element and the variation quantity in the logarithmic progress is little and the precision in the elongation progress gets worse. ]

[ For example, according ] *According* to the experimental data of this inventor, in the case [ of that ] *where* a transistor is [ put to use ] *used* in the logarithmic elongation process the variation quantity per 1 EV of the input [ in the logarithmic elongation progress ] is restricted to 18 mV at the base voltage because of the characteristics of the base voltage and the collector current of the transistor [ , however ] . *However*, when a comparison circuit according to the present invention is [ put to use ] *used* the variation quantity per 1 EV in the logarithmic compression process can be optionally changed [ , therefore ] . *Therefore*, [ under the condition ] *assuming* that the film sensitivity is on eleven grades (from ASA6 to ASA6400), the stop value on eight grades (from F14 to F16), the shutter speed on eleven grades (from 1/1000 second to 1 second), and the power voltage is 3V, the variation quantity per 1 EV in the logarithmic compression process can be made to 80 mV.

Therefore, the variation quantity per 1 EV in the logarithmic compression [ progress becomes ] *is* more and accordingly [ the ] exposure time control [ in ] *with* high precision becomes possible.

Besides, in the case of the present invention; the information of the film sensitivity and stop value is [ impressed in ] *provided to* the first input of the differential amplifier circuit as the bias voltage for [ condenser ] *capacitor* $C_2$, and to the second input of the differential amplifier circuit the information of the illuminance on the light receiving surface of the photoconductive element is added [ in being given the ] *after* logarithmic compression [ , therefore ] . *Therefore*, after the [ photometry ] *initial photometric measurement* is [ given with the opening photometry ] *made*, when [ seeing ] *observing* the focal depth by stopping down the diaphragm diameter of an exchange lens the illuminance on the light receiving surface of the photoconductive element is [ memorized ] *stored* in [ memory condenser ] *storage capacitor* $C_3$ by connecting switch $S_3$ to contact *b* from contact *a*, and then even though the stop value is changed to the desired focal depth the information of the stop value [ interlocks with condenser ] *is stored by capacitor* $C_2$ as [ the ] *a* bias voltage and has no relation to [ memory condenser ] *storage capacitor* $C_3$, so that even after *being* stopped down it is possible to change to any stop value.

Figure 9:
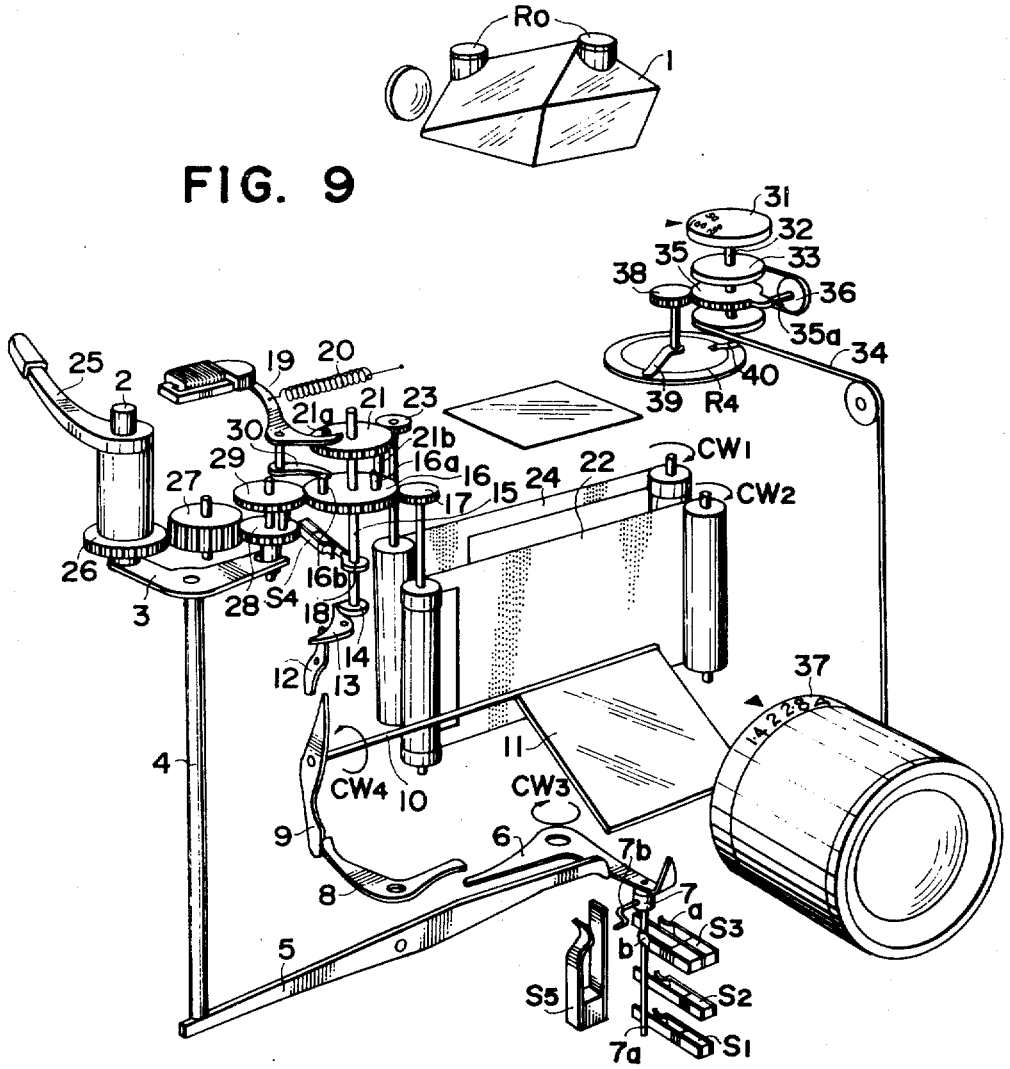
FIG. 9 is a perspective view showing the essential portion of an embodiment of the exposure time control device in accordance with the present invention.

FIG. 9 is a perspective view showing the essential portion of the embodiment of the mechanical interlocking [ relation ] *relationship* between the shutter mechanism, [ and ] the electromagnetic resistance, [ body ], the switch, [ and so on ] *etc.*, in the case [ of that ] *where* the exposure time control circuit shown in FIG. 2 is applied to a "through the lens" photometric type focal plane single reflex camera.

In the photometric state, ammeter A indicates the exposure time. Photoconductive element $R_0$ is provided on pentagonal prism 1 [ to do photometry ] *for the photometric measurement*.

Now, upon pushing shutter button 2 interlocking lever 3 is pushed down and lever 5 is turned counterclockwise by interlocking rod 4 to disengage from switch lever 6 having [ the ] *a* turning tendency [ to ] *in* the direction shown by arrow $CW_3$ [ , and pin ] . *Pin* 7a of insulation member 7 attached to

[ said ] switch lever 6 [ to switch over switches ] changes over change over switch $S_3$ to contact *b* from contact a and simultaneously cuts off switches $S_1$, $S_2$, and thereby *enabling the* charging [ to condensers ] *of capacitors* $C_1$, $C_2$ [ becomes possible ].

After change over switch $S_3$ is [ cut off ] *switched* from contact a, [ said ] pin 7a of insulation member 7 [ electrifies ] *actuates* main switch $S_5$ to excite electromagnetic coil M.

After main switch $S_5$ is [ electrified ] *actuated* switch lever 6 turns mirror lever 9 [ to ] *in* the direction shown by arrow $CW_4$ through intermediate lever 8 to let spindle 10 turn reflector 11 [ to ] *in* the same direction. And accordingly, by the turning of [ said ] reflector 11 the photometric state is changed over to the photographic state and the quantity of incident light to photoconductive element $R_0$ decreases gradually [, however ]. *However*, change over switch $S_3$ has already changed over to contact b from contact a, so that [memory condenser] *storage capacitor* $C_3$ has [ memorized ] *stored* the *signal representing the* resistance of photoconductive element $R_0$ [ at the photometric state ].

[ In the final progress ] *Finally*, mirror lever 9 engages with release lever 12 to turn it, and the pawl of opening screen restraining lever 13 disengages from restraining plate 14, and [ said ] restraining plate 14 turns together with the opening screen shaft, having [ the ] *a* turning tendency [ to ] *in* the direction shown by arrow $CW_2$, through spindle 15 and gears 16, 17, and opening screen 22 starts to open the shutter. And, at the same time protuberance 18 provided fixedly on [ said ] spindle 15 turns counter-clockwise to close trigger switch $S_4$ for [ condensers ] *capacitors* $C_1$, $C_2$, so that *the* charging [ to condensers ] *of capacitors* $C_1$, $C_2$ is started.

However, the closing screen is [ in being ] checked [ to run ] *from moving* by closing screen restraining restraining lever 19 attracted by electromagnetic coil M.

When the voltage of [ condenser ] *capacitor* $C_2$ [ gets ] *charges* to the [ memory ] *same* voltage [ of condenser ] *as capacitor* $C_3$ electromagnetic coil M is demagnetized and rear screen restraining lever 19 is turned clockwise by spring 20 *so as* not to engage with pin 21a and [ permit ] *permits* gear 21 to turn, so that shutter closing screen 24 starts to [ run ] *move* through gear 23 to close the shutter.

Upon turning winding lever 25 counter-clockwise, the film (not shown in the drawing) is wound and at the same time gear 16 is rotated clockwise through gear 26 integral to winding lever 25, gear 27, gear 28, and gear 29, and gear 21 also is rotated through pin 16a and pin 16b [, and when ]. *When* restraining plate 14 integral to gear 16 engages with the pawl of opening restraining lever 13 the shutter [ charge ] *cocking* is finished.

When the shutter [ charge ] *cocking* is finished pin 16b of gear 16 turns lever 30 counter-clockwise, and closing screen restraining lever 19 integral to lever 30 is turned counter-clockwise against spring 20 to form the well known holding [ magnet ] *mechanism*.

[ As ] *With respect* to interlocking wire 34, one end thereof is connected to pulley 33, rotated in a body with film sensitivity setting dial 31 by spindle 32, and the other end thereof is secured to diaphragm setting ring 37 on the lens barrel through pulley 36 pivoted on arm portion 35a [ projected to ] *projecting in* the radius direction from gear 35 fitted loosely on [ said ] spindle 32. And, slide brush 39 provided on the insulation spindle of gear 38 meshed with [ said ] gear 35 is arranged to slide on variable resistance $R_4$.

Therefore, upon setting up the film sensitivity by film sensitivity setting dial 31 and setting up the stop value by diaphram setting ring 37, slide brush 39 slides on variable resistance $R_4$ [ so as ] to [ get to the ] *provide* resistance value corresponding to the setting film sensitivity and the setting stop value. [ By the way, brush ] *Brush* 40 is a fixed brush.

When using the camera, electric power switch $S_1$ is [ electrified ] *closed*. The mechanism for changing over switch $S_3$ to contact b from contact a when stopping down the diaphragm diameter for the exchange lens is simple so that it is omitted in the drawings.

Figure 10:
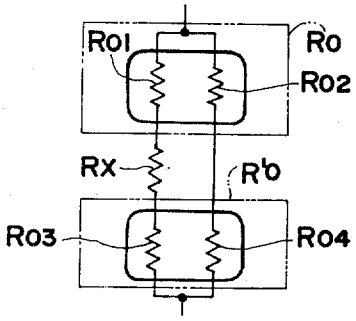
FIG. 10 shows a circuit diagram making use of two composite photoconductive elements in the light receiving portion of another embodiment in accordance with the present invention.

FIG. 10 shows [ an ] another embodiment in accordance with the present invention, wherein instead of the light receiving element in the photometric circuit shown in FIG. 5 two composite photoconductive elements $R_0$, $R_0'$ are connected in series [, and ]. *And* provided that the elements [ for constituting said ] *comprising* composite photoconductive elements $R_0$ are $R_{01}$, $R_{02}$ and the elements [ for ] constituting *the* other composite photoconductive element $R_0'$ are $R_{03}$, $R_{04}$, the illuminance — resistance characteristics of *each* respective element is as follows:

$$R_{01} = R_{03} = K_1 L^{-\gamma}, \quad R_{02} = R_{04} = K_2 L^{-\gamma}$$

[ and, by said ] *Using* both composite photoconductive elements the photographic field is divided [ to do photometry ] *for the photometric measurement*, and thereby for objects different in [ the ] *their* brightness ratio the proper average photometry can be effected.

What is claimed is:

1. An automatic shutter control device for a single lens reflex camera of the type having a photoconductive member receiving light from an object to be photographed via an objective lens, comprising:

means for generating a first output voltage proportional to the logarithm of intensity of light incident on said photoconductive member;

means for storing said first output voltage;

means for separating said means for storing from said means for generating a first output voltage with the shutter release operation;

means for generating a second output voltage as a function of a manually set exposure condition;

a transistor;

means for applying constant voltage to the base of said transistor;

a first integrating means connected to the emitter of said transistor for generating a signal that changes in proportion to the logarithm of an elapsed time period initiated by the shutter release operation;

means for initiating operation of said first integrating means in response to the shutter release operation;

means for generating a control signal when said signal [ plus ] *relative to* said *first and* second output [ voltage ] *voltages* [ are substantially equal to said first output voltage ] *provides a proper exposure*; and means for actuating shutter closing operation in response to said control signal.

2. An automatic shutter control device as in claim 1, further comprising second integrating means connected to the collector of said transistor for generating a third output voltage which changes in response to the change of said signal of said first integrating means, and said means for generating a control signal includes a comparing circuit for comparing said signal plus said second output voltage with said first output voltage.

3. An automatic shutter control device as in claim 2, wherein said photoconductive member comprises two parallelly connected photoconductive elements and said means for generating a first output voltage includes said photoconductive elements, a compensation resistor connected to at least one of said photoconductive elements and an output resistor connected to said compensation resistor to generate said first output voltage.

4. An automatic shutter control device as in claim 3, wherein said comparing circuit includes a differential amplifier circuit having a first input terminal to which said first output voltage is applied and a second input terminal to which both said second and third output voltages are applied and said means for generating a second output voltage biases said second integrating means.

5. An automatic shutter control device as in claim 4, further comprising an electric power source and said means for applying constant voltage includes a second transistor connected between said power source by the emitter and collector thereof and having a base connected to the collector of said second transistor through a resistor, the base of said first transistor being connected to the collector of said second transistor.

6. An automatic shutter control device as in claim 5, wherein said means for generating a first output voltage further includes means for generating a constant current, and said means for generating a second output voltage includes a variable resistor and said constant current flows through said variable resistor.

7. An automatic shutter control device as in claim 6, wherein said first and second integrating means are adjustable for changing the ratio of their respective stored signals.

8. An automatic shutter control device as in claim 7, further comprising means for indicating shutter speed prior to shutter release and responsive to said means for generating a first output voltage.

9. An automatic shutter control device as in claim 8, wherein said means for indicating shutter speed comprises an ammeter having double coils and two transistors in which each collector thereof is connected to a respective one of said double coils, and the base of one of said transistors is connected to said means for generating a first output voltage and the base of the other transistor is connected to said means for generating a second output voltage.

10. An automatic shutter control device for a single lens reflex camera of the type having a photoconductive member receiving light from an objective to be photographed via an objective lens, comprising:

an electric power source;

a detecting circuit including said photoconductive member connected to said electric power source for generating a first output voltage proportional to the logarithm of intensity of light incident on said photoconductive member;

a change over switch;

a storage means connected to said detecting circuit through said change over switch prior to exposure of the shutter for storing said first output voltage;

means including a variable resistor for generating a second output voltage as a function of an exposure condition manually set in the camera;

a transistor;

means for applying a constant voltage to the base of said transistor;

a first capacitance connected to the emitter of said transistor so that terminal voltage of said capacitor changes in proportion to the logarithm of an elapsed time period;

means for initiating the change of said terminal voltage of said first capacitor in response to opening operation of the shutter;

a second capacitor connected to the collector of said transistor and switch means for connecting said collector to said means for generating a second output voltage;

a differential amplifier circuit having two transistors, the base of one of said transistors is connected to the collector of said transistors and the base of the other transistor is connected to said storage means through said change over switch interlocked with the opening operation of the shutter for generating an output signal when the base potentials of both said transistors are substantially equal; and an electromagnet for terminating exposure and responsive to said output signal.

* * * * *